(12) United States Patent
Elberbaum

(10) Patent No.: US 6,328,270 B1
(45) Date of Patent: Dec. 11, 2001

(54) SWIVEL JOINT WITH CABLE PASSAGE FOR A TELEVISION CAMERA OR A CASE

(75) Inventor: David Elberbaum, Tokyo (JP)

(73) Assignee: Elbex Video Ltd., Tokyo (JP)

( * ) Notice: Subject to any disclaimer, the term of this patent is extended or adjusted under 35 U.S.C. 154(b) by 0 days.

(21) Appl. No.: 09/439,979

(22) Filed: Nov. 12, 1999

(51) Int. Cl.$^7$ .................. A47F 5/00; F16L 55/00
(52) U.S. Cl. .............. 248/288.31; 248/324; 248/543; 403/27; 285/90; 285/185
(58) Field of Search ............. 248/288.31, 288.51, 248/274.1, 288.11, 162.1, 160, 543; 403/27; 285/185, 90

(56) References Cited

U.S. PATENT DOCUMENTS

| | | | | |
|---|---|---|---|---|
| 921,833 | * | 5/1909 | Hespe et al. ................. | 285/185 |
| 2,439,009 | * | 4/1948 | Kujawski ..................... | 403/56 |
| 2,739,780 | * | 3/1956 | Richards ..................... | 248/324 |
| 2,859,983 | * | 11/1958 | May ............................ | 285/90 |
| 3,584,822 | * | 6/1971 | Oram .......................... | 248/160 |
| 4,017,197 | * | 4/1977 | Farrant ....................... | 403/27 |
| 4,111,571 | * | 9/1978 | Farrant ....................... | 403/27 |
| 4,494,177 | * | 1/1985 | Matthews .................... | 362/402 |
| 4,647,434 | * | 3/1987 | Ayers et al. ................ | 422/144 |
| 4,687,170 | * | 8/1987 | Beaver ........................ | 248/543 |
| 4,700,017 | * | 10/1987 | Morand ....................... | 174/86 |
| 4,842,308 | * | 6/1989 | Spotts ......................... | 285/261 |
| 5,132,492 | * | 7/1992 | Wieder ........................ | 174/65 R |

* cited by examiner

Primary Examiner—Anita King
(74) Attorney, Agent, or Firm—Rosenman & Colin LLP

(57) ABSTRACT

A combination of a swivel joint with an arm for mounting an apparatus for surveillance applications, such as a television camera includes a truncated ball, an arm attached at the end thereof to the truncated ball and having a passage for a cable, a ring-shaped holder having an inner curved rim of a curvature radius equal to that of the truncated ball for locking that truncated ball. An elongated cylindrical cover having an elongated cutout provides a passage to the arm for gripping the truncated ball and provides the arm with positioning capacity extending through the length of the cutout. A locking nut locks the cylindrical cover to the ring-shaped holder. The cylindrical cover can be rotated for positioning the cutout so that the arm can be adjusted to any position within the length of the cutout and the cable passing through the truncated ball and the holder is not obstructed.

36 Claims, 7 Drawing Sheets

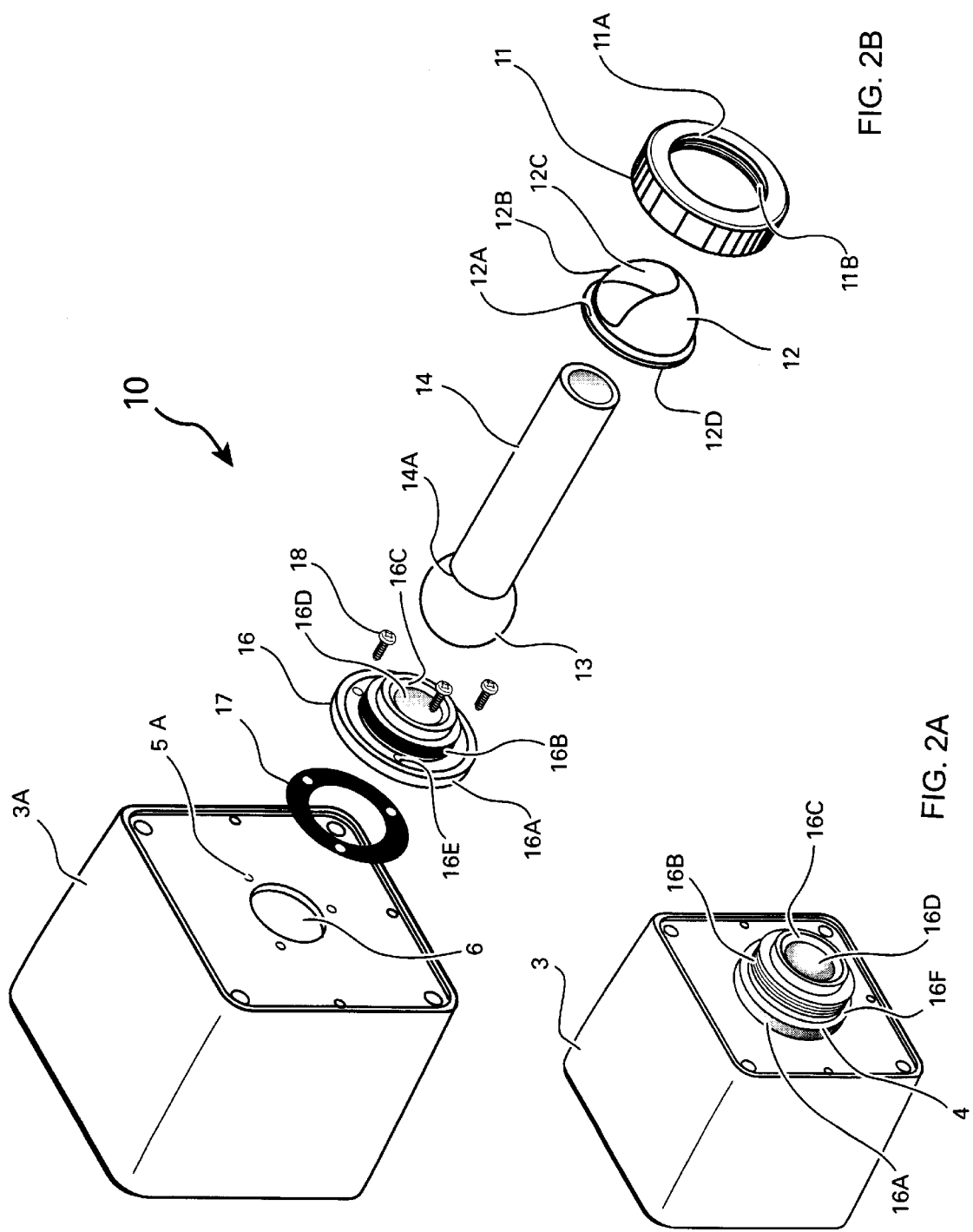

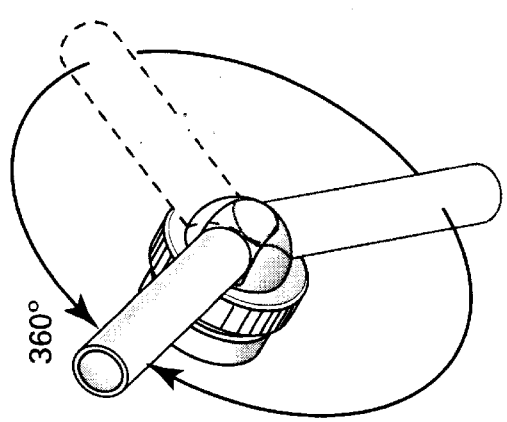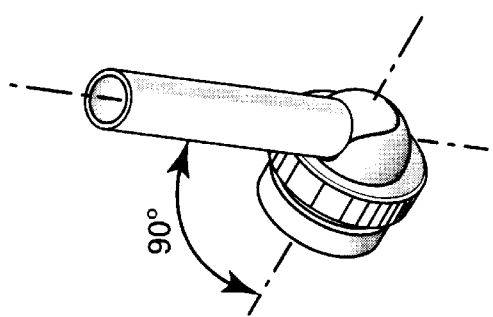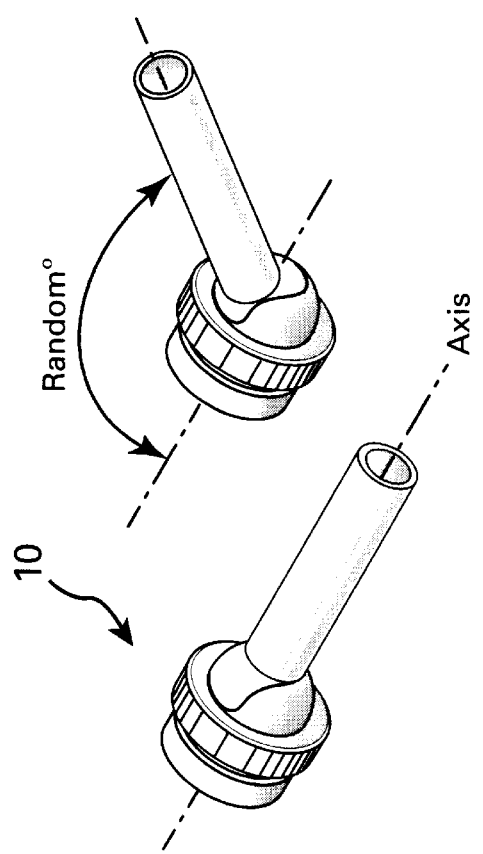
FIG. 3A  FIG. 3B  FIG. 3C  FIG. 3D

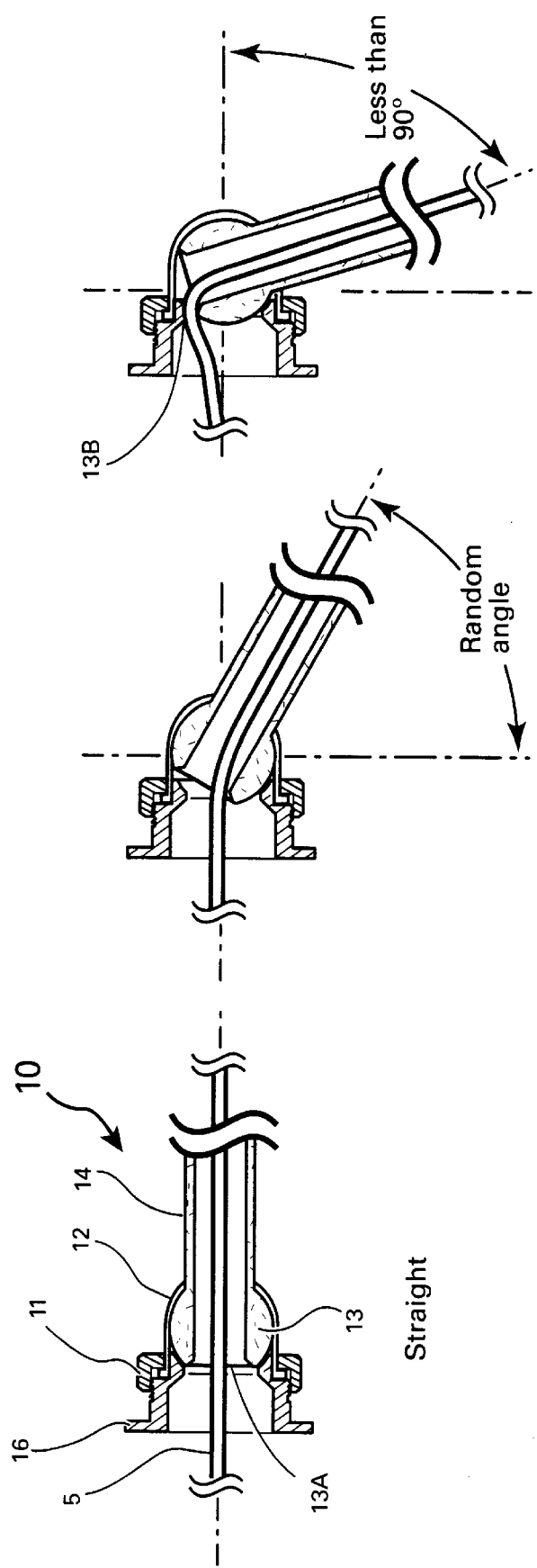

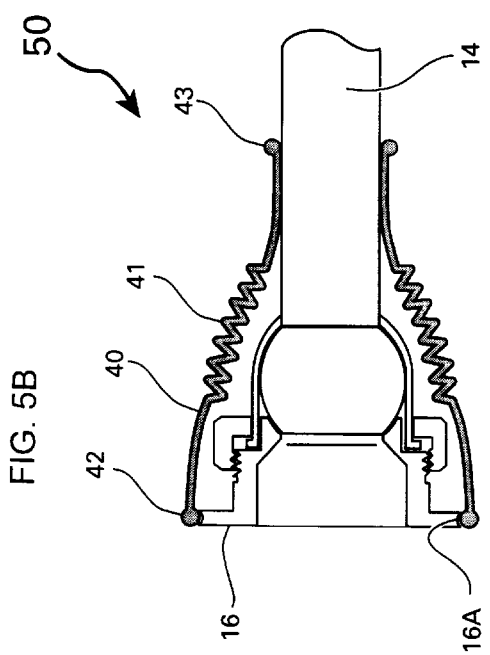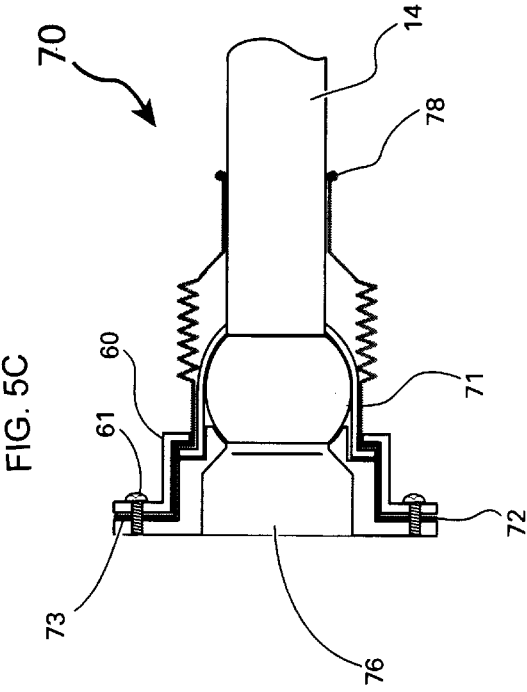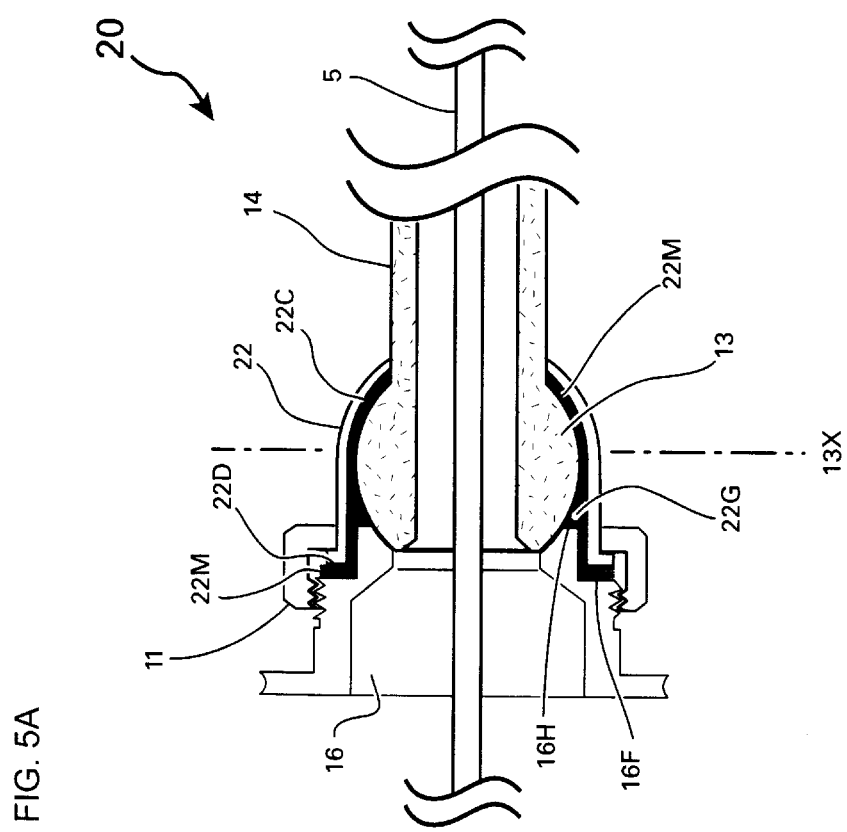

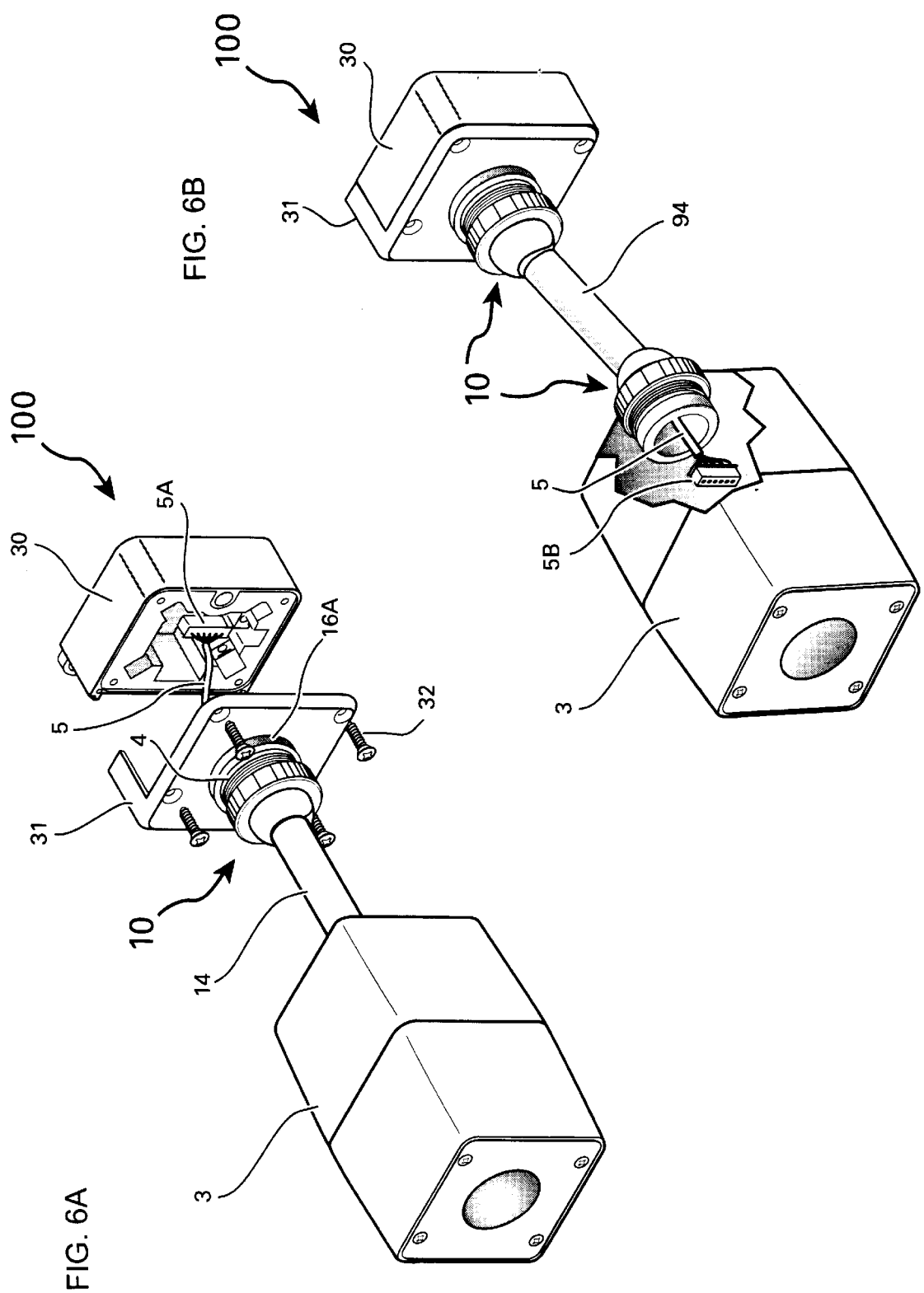

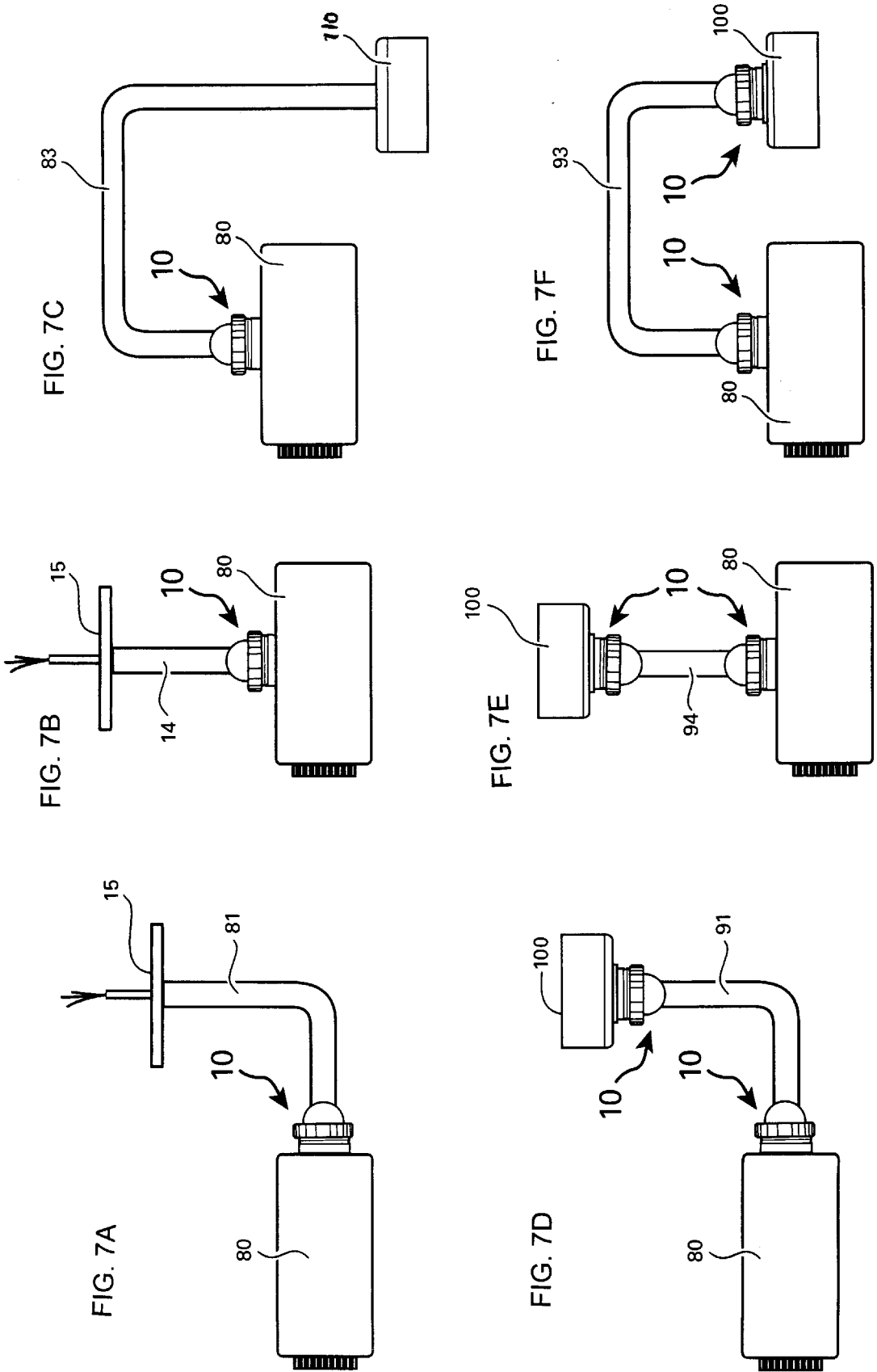

SWIVEL JOINT WITH CABLE PASSAGE FOR A TELEVISION CAMERA OR A CASE

BACKGROUND OF THE INVENTION

1. Field of the Invention

This invention relates to mounting accessories commonly used with a television camera or a case for surveillance applications.

2. Description of the Prior Art

Surveillance television cameras are commonly mounted onto a wall, pole, ceiling or other fixed base positions by using an extended arm, known as a camera mount. The extended arm or the camera mount includes a swivel joint, which permits the positioning of the horizontal and vertical axis of the camera in order to direct the camera lens toward its intended observation end. In many cases the television cameras are covered by a housing which is bulky and as a result the entire camera assembly, becomes large and heavy and this is very disturbing to the architecture of buildings and interiors. In all cases the cables or wires connecting the camera or to the camera housing are fed separately through cable inlets or via flexible electrical pipes, which is very disturbing to the interiors or the exteriors of well decorated buildings.

SUMMARY OF THE INVENTION

It is an object of the present invention to provide a swivel joint for a television camera that includes a passage for cables or wires connecting the cameras and permitting unobstructed positioning of the horizontal and vertical axes of the cameras for observing different scenes.

This and other objects of the present invention are attained by a swivel joint having a device comprising truncated ball; an arm attached at an end thereof to said truncated ball and having a passage for a cable through the length of said arm and said truncated ball; a ring-shaped holder including an outer thread and an inner curved rim having a curvature radius equal to a radius of said truncated ball for supporting and locking said truncated ball, and means for attaching said ring-shaped holder to a case of an apparatus for surveillance applications and for providing passage for said cable to said case through said ring-shaped holder; an elongated cylindrical cover having a flanged rim at one end thereof and a hemispherical shape at another end thereof and further including an elongated cutout having a width slightly wider than a width of said arm and extending from a center of said hemispherical shape toward said flanged rim for providing a passage to said arm and for gripping said truncated ball inside a hemispherical portion of said hemispherical shape and for providing said arm with positioning capacity extending through a length of said cutout; and a locking nut having a thread complementary to said outer thread and an inner shoulder for attaching and locking said elongated cylindrical cover to said ring-shaped holder by engaging said flanged rim with said inner shoulder and tightening said nut onto said outer thread and locking said truncated ball between said inner curved rim and said hemispherical portion, wherein said cylindrical cover can be rotated for positioning said cutout around the axis of said hemispheric shape and said arm can be adjusted to any position within the length of said cutout and wherein said cable passing through said truncated ball and said holder is not obstructed.

BRIEF DESCRIPTION OF THE DRAWINGS

The foregoing and other objects and features of the present invention will become apparent from the following description of preferred embodiments of the invention with reference to the accompanying drawings, in which:

FIG. 2A is a perspective view of the camera case with the swivel joint of FIG. 1A;

FIG. 2B is an exploded perspective view of the swivel joint of FIG. 1A with an arm device;

FIGS. 3A, 3B, 3C, and 3D are perspective views of the different positionings of the swivel joint of the preferred embodiment of the invention;

FIGS. 4A, 4B, and 4C show sectional views of a cable passage through the swivel joint of the preferred embodiment;

FIGS. 5A, 5B, and 5C are sectional views of different sealings applied to a swivel joint of the invention;

FIGS. 6A and 6B are a partly exploded view and a perspective view, respectively, of television camera cases using single and dual joints; and FIGS. 7A–7F are side views illustrating mounting methods for cameras and a mount with the swivel joint of the present invention.

DETAILED DESCRIPTION OF THE PREFERRED EMBODIMENTS

Figure 1B:
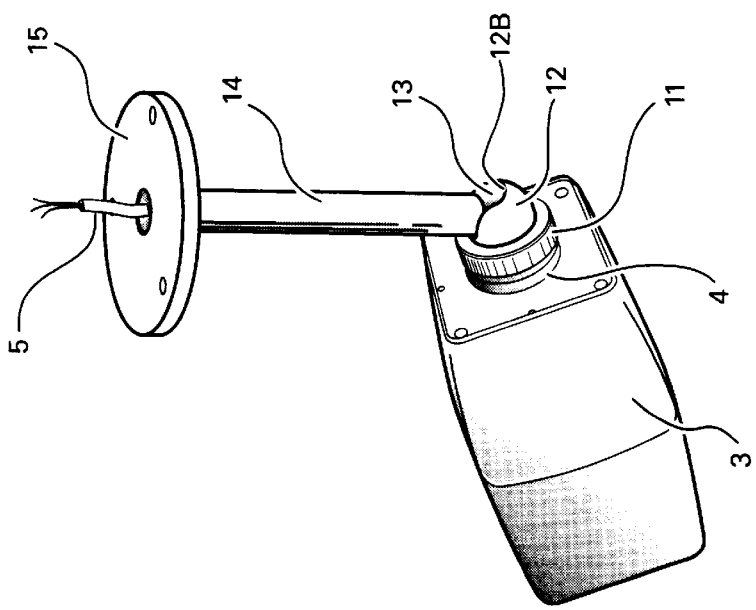
FIGS. 1A and 1B are perspective views of television camera cases using a swivel joint of the preferred embodiment.
Figure 1A:
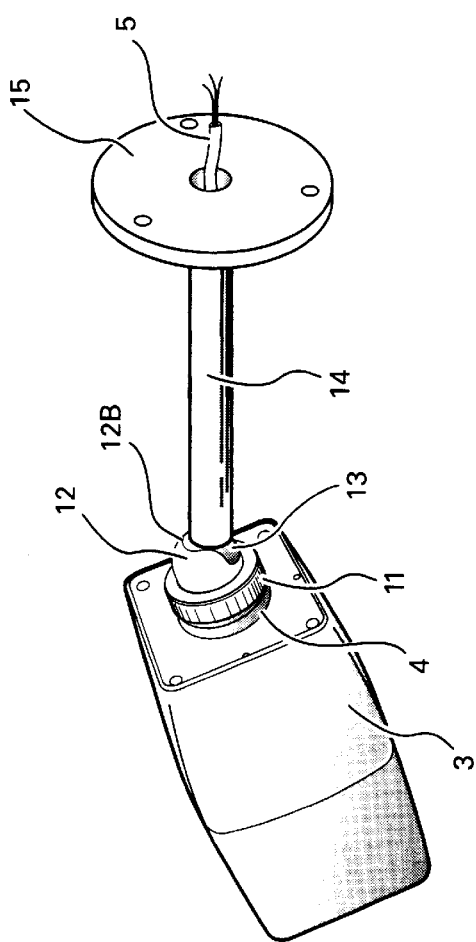

A camera case 3 for mounting onto a wall shown in FIG. 1A comprises a ring-shaped holder 4 that is attached to a pipe 14 via a swivel joint 10 of FIG. 2B. The swivel joint 10 consists of a locking nut 11, a rotating ball head 13 and a locking cover 12. The other end of pipe 14 is attached to a flange 15, which is fixedly connected to a wall or other vertical planes. A connecting cable 5 passes through the swivel joint 10 and through the pipe 14 and flange 15.

A camera housing 3 for mounting to a ceiling shown in FIG. 1B is identical with the camera housing 3 of FIG. 1A for mounting onto a wall with the exception of the locking cover 12 which is shown mounted with its cutout 12B upwards, while the same cover 12 is shown with its cutout 12B downwards for the wall mounting of FIG. 1A. The ring-shaped holder 4 is a molded part of the camera case 3 but it is similar to the ring-shaped holder 16 of the swivel joint system 10 shown in FIGS. 2A and 2B.

The swivel joint system 10 of FIG. 2A, 2B comprises the holder 16, which is attached to the camera case 3 using a seal 17 and screws 18 or other fasteners. An opening 6 of the camera case 3 provides the inlet for a connecting cable or wires and the holes or threaded holes 5A are complementary holes to the holes 16E of the holder 16 and for the screws 18. The holder 16 comprises an outer ring 16A for supporting the ring-like portion 42 of a seal 40 of FIG. 5B, an inner opening 16D for providing a passage for a cable, an outer thread 16B for locking nut 11 and a curved inner face 16C having a curvature radius equal to the radius of the rotating ball 13. The pipe 14 provides for cable passage to and from the camera case in addition to being the holder or the arm for the camera case and consists of a rotating ball 13 on its camera side end.

The locking cover 12 consists a flanged rim 12A, a cutout 12B and an inner elongated cylindrical cavity having a hemispherical top with a curvature radius equal to the radius of the rotating ball 13. The cutout 12B with a width slightly larger than the diameter of the pipe 14 provides for moving the pipe for up to 90° about the center axis of its rotating ball 13 throughout the length of the cutout 12B.

The locking nut 11 includes a thread 11B which is complementary thread to the thread 16B of the ring holder 16 and an inner shoulder 11A for engaging and tightening the rim 12A of the locking cover 12 to the holder 16 and for gripping and locking the rotating ball 13 into position. As shown in FIG. 3A the swivel joint 10 can be locked in a straight position, or it can be locked into a bent position of about 90° shown in FIG. 3C, or it can be locked in a random bent position between FIG. 3A and FIG. 3C such as the position shown in FIG. 3B. FIG. 3D illustrates how the 90° bend position, or any other bent position, can be rotated fully for a full 360° rotation around its axis about the center core of the rotating ball 13.

Shown in FIGS. 4A, 4B and 4C are the sectional views of the swivel joint 10. FIG. 4A shows the joint in its straight position, FIG. 4B shows the joint in a randomly bent position and FIG. 4C shows the joint in less than 90° bent position. Also shown is cable 5 that passes through the pipe 14 and the swivel joint 10. The truncated section 13A of the rotating ball 13 provides the opening 13B for the passage of cable 5 through the joint when the joint is bent as shown in FIG. 4C. It becomes obvious from the sectional view of FIGS. 4B and 4C that the cable passage is wider when the joint is locked into smaller bent, or if the rotating ball 13 is truncated by a larger section 13A of the rotating ball 13, such smaller bent or larger truncated section also provides for a thicker cable to pass through the opening 13B. However, larger truncated section 13A reduces the joint gripping power because a smaller surface of the rotating ball engages the curved inner face 16C of the holder 16 and the inner surface of the locking cover 12. Accordingly it is possible to construct a variety of swivel joints with different gripping power, and for different cable thickness on the basis of the size of the truncated section 13A, or provide for different cable thickness by limiting the joint bending angles through a shorter cutout 12B.

The swivel joint may be installed outdoors exposed to rain and/or snow and therefore it requires a watertight sealing for which a seal is provided inside the locking cover 22 of the swivel joint 20 shown in FIG. 5A. The entire inner surface 22C of the locking cover 22 and its flange area 22D is coated with a rubber or other sealing material 22M having uniform coating thickness, except for a part 22G surrounding the ball 13 and extending from the center core axis 13X of the ball 13 to the rim 16H of the holder 16 for sealing the inner cavities between the ball 13 and the locking cover 22 as shown in FIG. 5A. Accordingly, when the locking cover 22 is tighten by the locking nut 11 it engages the coated seal with the outer surface of the rotating ball 13 to seal all the gaps between the locking cover 22 and the outer surface of the ball 13 as well as the gap between the flange surface 22D of the locking cover and the flange surface 16F of the holder 16.

Shown in FIG. 5B is another sealed swivel joint 50 using a flexible sealing pipe 40 with a bellows section 41 or other flexible pipe form, terminated by a thicker, ring like portions 42 and 43, having high tensile gripping power and thereby sealing the gap between the outer rim 16A of the holder 16 and the ring like portion 42 of the sealing pipe 40 and between the pipe 14 and the ring like portion 43 of the other end of the sealing pipe 40. Instead of relying on the high tensility of the pipe ends 42 and 43 the flexible sealing pipe 40 can be sealed to the outer rim 1 6A and/or the pipe 14 using well known sealing accessories such as tension bands and the like.

Many other shapes of a sealing pipe or a cover can be used for sealing the entire swivel joint 50. It is also possible to replace the locking nut 11 with a cover 60 and lock the joint 70 using screws 61 as shown in FIG. 5C instead of the thread 16B and 11B used for locking the swivel joint 10, 20 or 50 by the locking nut 11. The cover 60 is sealed by the flange 72 of the sealing pipe 71 which seals the gap between the cover 60 and the flange 73 of the holder 76. The other end 78 of the sealing pipe which has a high tensile gripping power seals the gap between the pipe 14 and the sealing pipe, thereby sealing the entire swivel joint 70 as shown in FIG. 5C. Shown in FIG. 6A is a mount 100 consisting of a base 30 and a cover 31. The mount base is commonly used instead of the flange 15 shown in FIG. 1A for attaching the arm or the pipe 14 to a wall or a ceiling or to any other structure. The mount 100 provides the terminals for connecting power and signal wires and cables (not shown) and may also comprise power supply, or power adaptor and/or other electronic circuits.

Commonly used mounts can be provided with means for fixedly attaching the arm or pipe 14 shown in FIG. 1A. However the cover 31 of the mount 100 shown in FIG. 6A comprises the holder 4 for attaching the swivel joint 10 and thereby providing a swivel joint to the mount 100 instead of to the camera case 3 which is fixedly attached to the arm or pipe 14. The outer rim 16A of the holder 4 can be used for a sealing pipe 40 shown in FIG. 5B. The cable 5 is shown terminated with a connector 5A which provides for easy hookup of the camera case 3 with its attached pipe 14, cable 5, and mount cover 31 to the mount base 30.

FIG. 6B shows a setup wherein two swivel joints 10 are used at both ends of the pipe 94, to provide better flexibility for positioning and directing the camera toward its intended observation. The cable 5 is shown terminated with a connector 5B which provides for easy hookup of a camera (not shown) inside the case 3.

Shown in FIG. 7A is a television camera 80 mounted to a ceiling using a flange 15 and a pipe 81 bended into an L shape or 90° and with the swivel joint attached to the rear of the camera 80. The swivel joint can be attached to the side of the camera 80 the same way it is attached to the camera's rear.

FIG. 7B shows a television camera 80 mounted to a ceiling using a flange 15, a pipe 14 and a swivel joint 10 attached to the top of the camera 80.

It is obvious that the flange 15 of FIG. 7B could be mounted on top of a shelf as shown in FIG. 7C and the swivel joint 10 could be attached to the bottom of camera 80 of FIG. 7B. The camera 80 of FIG. 7C is attached to an inverted U-shape pipe 83 via the swivel joint 10, which is mounted on top of the camera 80, while the pipe 83 is mounted on top of a shelf using a mount 110. However, it is obvious that the mount 110 of FIG. 7C could be mounted to a ceiling instead of on top of a shelf and that the swivel joint 10 of FIG. 7C could be attached to the bottom of the camera 80 instead of to its top.

FIG. 7D shows a variation of FIG. 7A wherein instead of the flange 15 the camera 80 is mounted by using the mount 100, two swivel joints 10 and a 90° or L shape pipe 91 providing more flexibility for the positioning of the camera 80.

FIG. 7E shows a variation of FIG. 7B wherein instead of the flange 15 the camera 80 is mounted by using the mount 100, two swivel joints 10 and a pipe 94, providing more flexibility for the positioning of the camera 80.

FIG. 7F shows a variation of FIG. 7C wherein instead of the flange 15 the camera 80 is mounted by using the mount 100, two swivel joints 10 and an inverted U-shape pipe 93, providing more flexibility for the positioning of the camera 80.

The swivel joints 10 of FIGS. 7A–7F can be replaced by the swivel joints 20, 50 or 70 of FIGS. 5A, 5B and 5C, if the camera 80 is mounted outdoors and must be watertight sealed.

The arms 14, 81, 83, 91, 93 and 94 shown in FIGS. 7A–7F are round pipes. However, many other forms of an arm such as square, triangle or a random shape can be used instead as long as the arm provides a passage for the cable and/or wires through the length of the arm and as long as the portion of the arm 14A shown in FIG. 2A that touches the cutout 12B is round, or that the cutout 12B is shaped to complement the shape of the arm portion 14A if that portion is not round.

It is clear that the swivel joints 10, 20, 50 and 70 and variations thereof can be used for mounting television cameras and camera cases, indoors and outdoors, in endless mounting possibilities and provide flexible adjustments for directing the cameras to its intended scene and simultaneously provide cable passages through the swivel joint or joints and through the pipe or the arms holding the camera into place.

It will of course, be understood by those skilled in the art that the particular embodiment of the invention here presented is by way of illustration only, and is meant to be in no way restrictive, therefore, numerous changes and modifications may be made, and the full use of equivalents resorted to, without departing from the sprit of scope of the invention as outlined in the appended claims.

What is claimed is:

1. A combination of swivel joint with an arm device for supporting a case of an electrical apparatus comprising:
    a truncated ball;
    an arm attached at an end thereof to said truncated ball and having a passage for a cable through the length of said arm and said truncated ball;
    a ring-shaped holder including an outer thread and an inner curved rim having a curvature radius equal to a radius of said truncated ball for supporting and locking said truncated ball, and means for attaching said ring-shaped holder to said case for providing a passage for said cable to said case through a ring-shaped holder;
    an elongated cylindrical cover having a flanged rim at one end thereof and a hemispherical shape at another end thereof and further including an elongated cutout having a width slightly wider than a width of said arm and extending from a center of said hemispherical shape toward said flanged rim for providing a passage to said arm and for gripping said truncated ball inside a hemispherical portion of said hemispherical shape and for providing said arm with positioning capacity extending through a length of said cutout;
    a locking nut having a thread complementary to said outer thread and an inner shoulder for attaching and locking said elongated cylindrical cover to said ring-shaped holder by engaging said flanged rim with said inner shoulder and tightening said nut onto said outer thread and locking said truncated ball between said inner curved rim and said hemispherical portion,
    wherein said cylindrical cover can be rotated for positioning said cutout around the axis of said hemispheric shape and said arm can be adjusted to any position within the length of said cutout and wherein said cable passing through said truncated ball and said holder is not obstructed.

2. The combination according to claim 1, wherein said case is a case of a television camera.

3. The combination according to claim 1, wherein said ring-shaped holder is molded onto said case to form an integral ring-shaped holder and wherein said ring-shaped holder includes a passage for said case.

4. The combination according to claim 3, and further comprising a layer of a seal covering all internal surface of said cylindrical cover including a surface of said flanged rim for sealing gaps and cavities between said cylindrical cover and said truncated ball and between said flanged rim and said ring-shaped holder for providing a watertight sealed swivel joint.

5. The combination according to claim 1, and further comprising a seal for sealing a gap between said ring-shaped holder and said case and a layer of a seal covering all internal surface of said cylindrical cover including a surface of said flanged rim for sealing gaps and cavities between said cylindrical cover and said truncated ball and between said flanged rim and said ring-shaped holder for providing watertight sealed swivel joint.

6. The combination according to claim 3, wherein said case comprises an outer ring surrounding said integral ring-shaped holder, a flexible sealing pipe for sealing said swivel joint consisting of two high tensile ends and a center body having a shape selected from a bellows and a flexible pipe form wherein one end of said flexible sealing pipe grips and seals outer ring surrounding said integral ring-shaped holder by a high tensile grip and wherein said center body covers and seals the entire swivel joint.

7. The combination according to claim 1, wherein said case further comprises:
    a seal for sealing a gap between said ring-shaped holder, and outer sealing ring surrounding said ring-shaped holder; and a flexible sealing pipe for sealing swivel joint consisting of two high tensile ends and a center body having a shape selected from a bellows and a flexible pipe form wherein one end of said flexible sealing pipe grips and seals said arm by a high tensile grip and the other end of said flexible sealing pipe grips and seals said outer sealing ring surrounding said ring-shaped holder by a high tensile grip and wherein said center body covers and seals the entire swivel joint.

8. The combination according to claim 6, wherein at least one of said two high tensile ends includes a sealing band to tighten said ends to one of said arm and said outer ring.

9. The combination according to claim 7, wherein at least one of said two high tensile ends includes a sealing band to tighten said ends to one of said arm and said outer sealing ring.

10. The combination according to claim 6, and further comprising:
    a locking cover having a sealing flange and a shoulder for engaging said flanged rim instead of said locking nut, wherein said ring-shaped holder includes a flanged base with means for attaching said sealing flange and wherein said flexible sealing pipe further includes a flanged end for sealing a gap between said sealing flange and said flanged base.

11. The combination according to claim 7, and further comprising:
    a locking cover having a sealing flange and a shoulder for engaging said flanged rim instead of said locking nut, wherein said ring-shaped holder includes a flanged base with means for attaching said sealing flange and wherein said flexible sealing pipe further includes a flanged end for sealing a gap between said sealing flange and said flanged base instead of said high tensile end.

12. The combination according to claim 1, wherein another end of said arm is attached to a mounting means for fixedly attaching said swivel joint to a structure selected from the group consisting of a wall, a pole, a ceiling and a shelf and wherein said mounting means includes a passage for said cable.

13. The combination of claim 12, wherein said mounting means is a mounting flange.

14. The combination according to claim 1, wherein another end of said arm is fixedly attached to a mounting device for supporting said arm;
said mounting device includes a base with means for attaching said mounting device to a structure selected from the group consisting of a wall, a pole, a ceiling, and a shelf and means for attaching said mounting device to said base, wherein said mounting device incorporates a passage for said cable and means for connecting said cable.

15. The combination of claim 14, wherein said case is a case of a television camera.

16. The combination according to claim 15, wherein said mounting device for supporting said arm further includes power-supplying means for operating said television camera.

17. The combination according to claim 1, wherein said ring-shaped holder is attached to a mounting device for supporting said arm and another end of said arm is fixedly attached to said case;
said mounting device including a base with means for attaching said mounting device to a structure selected from the group consisting of a wall, a pole a ceiling, and a shelf and means for attaching said mounting device to said base and wherein said mounting device incorporates a passage for said cable and means for connecting said cable.

18. The combination according to claim 17, wherein said case is a case of a television camera.

19. The combination according to claim 18, wherein said mounting device further comprises power-supplying means for operating said television camera.

20. A combination of dual swivel joints with an arm device for supporting a case of an electric apparatus, comprising;
two truncated balls;
an arm attached at two ends thereof to said truncated balls respectively, having a passage for a cable through the length of said arm and said truncated balls;
two ring-shaped holders each including an outer thread and an inner curved rim having a curvature radius equal to a radius of said truncated balls for supporting and locking said truncated balls and means for attaching one of said ring-shaped holders to said case and another one of said ring-shaped holders to a mounting device supporting said arm and for providing a passage for said cable between said case and said mounting device through said ring-shaped holders;
two elongated cylindrical covers each having a flanged rim at one end thereof and a hemispherical shape at another end thereof and further including an elongated cutout having a width slightly wider than a width of said arm and extending from a center of said hemispherical shape toward said flanged rim for providing a passage to said arm and for gripping said truncated balls inside hemispherical-shaped portions of said cylindrical covers and for providing said arm with positioning capacity extending through the length of each said elongated cutout; and
two locking nuts each having a thread complementary to said outer thread and an inner shoulder for attaching and locking one of said elongated cylindrical covers to one of said ring-shaped holders by engaging said flanged rim with said inner shoulder and for tightening said nut onto said outer thread and locking each said respective one of said truncated balls between said inner curved rim and said hemispherical-shaped portion;
wherein one of said elongated cylindrical covers can be rotated for positioning said cutout around an axis of said hemispherical shaped portion and said arm can be adjusted to any position within the length of said cutout and said cable passing through said truncated balls and said holders is not obstructed.

21. The combination according to claim 20, wherein said case is a case of a television camera.

22. The combination of said mount according to claim 20, wherein one of said ring-shaped holders is molded onto one of said case and said mounting device to form an integral ring-shaped holder of one of said case and said mounting device, wherein said integral ring-shaped holders include an additional passage for said cable to said case and to said mounting device.

23. The combination according to claim 22, and further comprising a layer of a seal covering an internal surface of each said elongated cylindrical cover including a surface of said flanged rim for sealing gaps and cavities between said elongated cylindrical cover and said truncated ball and between said flanged rim and said ring-shaped holder for providing watertight sealed swivel joints.

24. The combination according to claim 23, wherein said case is a case of a television camera.

25. The combination according to claim 22, and further comprising two seals for sealing gaps between said two ring-shaped holders, said case, said cover, and a layer of a seal covering all internal surface of each said elongated cylindrical cover including the surface of said flanged rim for sealing the gaps and cavities between said cylindrical cover and said truncated ball and between said flanged rim and said ring-shaped holder for providing watertight sealed swivel joints.

26. The combination according to claim 22, and further comprising two outer rings, surrounding said integral ring-shaped holders and two flexible sealing pipes for sealing said dual swivel joints each consisting of two high tensile ends and a center body having a shape selected from a bellows and a flexible pipe form, wherein one end of each of said flexible sealing pipes grips and seals said arm by a high tensile grip and another end of each of said flexible sealing grips and seals a respective one of said outer rings by a high tensile grip and wherein each center body covers and entirely seals each said swivel joint.

27. The combination of claim 22, wherein said is a case of a television camera.

28. The combination according to claim 20, and further comprising:
a first seal for sealing a gap between one of said ring-shaped holder and said case and a second seal for sealing a gap between said ring-shaped holder and said mounting device and wherein each of said ring-shaped holders further includes an outer ring surrounding said ring-shaped holder; and
two flexible sealing pipes for sealing said dual swivel joints each including two high tensile ends and a center body having a shape selected from a bellows and a flexible pipe form, wherein one end of each said flexible sealing pipes grips and seals said arm by a high tensile grip and another end of each of said flexible sealing pipes grips and seals a respective said outer ring by a high tensile grip and wherein each center body covers and entirely seals each of said swivel joints.

29. The combination according to claim 28, wherein said case is a case of a television camera.

30. The combination according to claim 26, wherein at least one of said two high tensile ends includes means to tighten said ends to one of said arm and said outer ring.

31. The combination according to claim 30, wherein said case is a case of a television camera.

32. The combination according to claim 28, wherein at least one of said two high tensile ends includes a means to tighten said ends to one of said arm and said outer ring.

33. The combination according to claim 30, wherein said case is a case of a television camera.

34. The combination according to claim 20, wherein one of said ring-shaped holders is molded onto said case and another of said ring-shaped holders is molded onto said mounting device to form respectively a first integral ring-shaped holder of said case and a second integral ring-shaped holder of said mounting device and wherein said first and second integral ring-shaped holders include an additional passage for said cable to said case and to said mounting device.

35. The combination according to 34, and further comprising two seals for sealing gaps between said two ring-shaped holders, said case, said cover, and a layer of a seal covering all internal surface of each said elongated cylindrical cover including the surface of said flanged rim for sealing the gaps and cavities between said cylindrical cover and said truncated ball and between said flanged rim and said ring-shaped holder for providing watertight sealed swivel joints.

36. The combination according to claim 34, and further comprising two outer rings surrounding said integral ring-shaped holders and two flexible sealing pipes for sealing said dual swivel joints each consisting of two high-tensile ends and a center having a shape selected from a bellows and a flexible pipe form, wherein one end of each of said flexible sealing pipes grips and seals said arm by a high tensile grip and another end of each of said flexible sealing pipe grips and seals a respective one of said rings by a high tensile grip and wherein each center body covers and entirely seals each said swivel joint.

* * * * *